United States Patent
Baker

(10) Patent No.: US 12,325,262 B1
(45) Date of Patent: Jun. 10, 2025

(54) LUBRICATION DISTRIBUTION SYSTEMS, POWERTRAINS INCORPORATING THE SAME, AND METHODS OF USING THE SAME

(71) Applicant: ALLISON TRANSMISSION, INC., Indianapolis, IN (US)

(72) Inventor: Christopher A. Baker, Brownsburg, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 18/537,756

(22) Filed: Dec. 12, 2023

(51) Int. Cl.
 B60B 35/16 (2006.01)
 F16C 33/66 (2006.01)

(52) U.S. Cl.
 CPC .......... B60B 35/16 (2013.01); F16C 33/6659 (2013.01)

(58) Field of Classification Search
 CPC ... B60B 35/16; F16C 33/6659; F16H 57/0456
 See application file for complete search history.

(56) References Cited

U.S. PATENT DOCUMENTS

| | | | | |
|---|---|---|---|---|
| 3,535,002 A | * | 10/1970 | Stamm | B60B 35/16 301/124.1 |
| 4,468,981 A | * | 9/1984 | Ries | F16H 57/0434 180/370 |
| 5,316,106 A | * | 5/1994 | Baedke | F16N 39/02 184/6.12 |
| 5,540,300 A | * | 7/1996 | Downs | F16H 57/0457 184/104.1 |
| 6,135,241 A | * | 10/2000 | Ganguly | F16H 57/0483 184/6.12 |
| 6,843,746 B2 | | 1/2005 | Hayes et al. | |
| 6,997,284 B1 | | 2/2006 | Nahrwold | |
| 8,858,381 B2 | * | 10/2014 | Trost | F16H 57/0457 475/160 |
| 10,161,502 B2 | | 12/2018 | Kwasniewski et al. | |
| 10,167,944 B2 | | 1/2019 | Kwasniewski et al. | |
| 10,626,979 B2 | | 4/2020 | Hayes et al. | |
| 11,440,348 B1 | | 9/2022 | Bodary et al. | |
| 11,498,361 B2 | * | 11/2022 | Yu | B60B 35/14 |
| 11,566,698 B1 | | 1/2023 | Kluck et al. | |
| 11,718,127 B2 | | 8/2023 | Shah et al. | |

(Continued)

FOREIGN PATENT DOCUMENTS

| | | |
|---|---|---|
| EP | 2660493 B1 | 4/2017 |
| EP | 2988028 B1 | 7/2020 |
| EP | 4102107 A1 | 6/2022 |

(Continued)

*Primary Examiner* — Thomas C Diaz
(74) *Attorney, Agent, or Firm* — Taft Stettinius & Hollister LLP; Stephen F. Rost

(57) ABSTRACT

Vehicles, powertrains for vehicles, and methods of delivering pressurized lubrication fluid to at least one wheel end bearing of a vehicle are disclosed. A vehicle includes a chassis, a plurality of wheels coupled to the chassis, and a powertrain mounted to the chassis. The powertrain includes a transaxle that includes a housing, an axle assembly at least partially disposed in the housing, and a lubrication distribution system at least partially disposed in the housing that includes a feed tube assembly to deliver pressurized lubrication fluid to at least one wheel end bearing in use of the vehicle.

20 Claims, 7 Drawing Sheets

(56) References Cited

U.S. PATENT DOCUMENTS

2016/0047461 A1    2/2016  Kelly et al.
2018/0117965 A1*   5/2018  Gregg .................... B60B 35/04

FOREIGN PATENT DOCUMENTS

| EP | 4075025 | A3 | 11/2022 |
| EP | 4184038 | A1 | 5/2023 |
| WO | 2020014559 | A1 | 1/2020 |

* cited by examiner

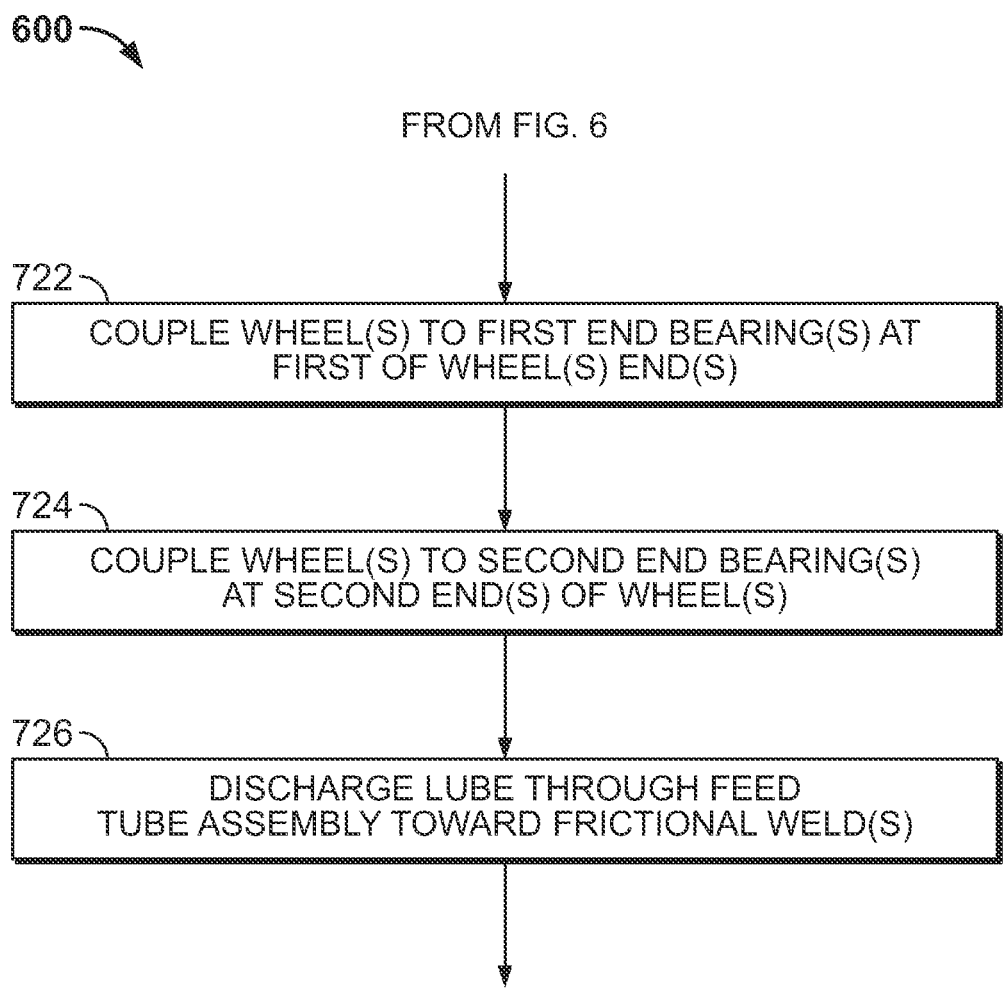

LUBRICATION DISTRIBUTION SYSTEMS, POWERTRAINS INCORPORATING THE SAME, AND METHODS OF USING THE SAME

FIELD OF THE DISCLOSURE

The present disclosure relates, generally, to powertrain configurations for vehicles, and, more specifically, to powertrain configurations for electric vehicles.

BACKGROUND

A powertrain incorporated into a vehicle may include one or more drive unit(s) and a transaxle coupled to the one or more drive unit(s) and to one or more wheel(s) of the vehicle to transmit rotational power supplied from the one or more drive unit(s) to the one or more wheel(s). The one or more wheel(s) may be coupled to, and/or supported for rotation by, one or more bearing(s) requiring lubrication. Systems, devices, and/or methods for lubricating such bearing(s) that avoid drawbacks associated with some configurations remain an area of interest.

SUMMARY

The present disclosure may comprise one or more of the following features and combinations thereof.

According to one aspect of the present disclosure, a vehicle may include a chassis, a plurality of wheels coupled to the chassis, and a powertrain mounted to the chassis. The powertrain may include a transaxle having a housing, an axle assembly at least partially disposed in the housing, and a lubrication distribution system at least partially disposed in the housing that includes a feed tube assembly to deliver pressurized lubrication fluid to at least one wheel end bearing in use of the vehicle. At least one of the plurality of wheels may be mounted to the axle assembly to be driven for rotation by the axle assembly about a rotational axis. A first wheel end bearing may be coupled to the at least one of the plurality of wheels at a first end of the at least one of the plurality of wheels. The feed tube assembly may be mounted to the housing such that a discharge nozzle of at least one feed tube of the feed tube assembly extends toward a frictional weld of the housing. The discharge nozzle may be positioned in the housing to discharge pressurized lubrication fluid toward the frictional weld to lubricate the first wheel end bearing in a controlled manner without constant delivery of lubrication fluid to the first wheel end bearing.

In some embodiments, the at least one feed tube of the feed tube assembly may be directly affixed to the housing. Additionally, in some embodiments, the at least one feed tube of the feed tube assembly may be directly affixed to the housing such that (i) a body of the at least one feed tube extends parallel to the rotational axis and (ii) the discharge nozzle coupled to the body extends at an angle relative to the rotational axis. The discharge nozzle may be bent relative to the body. Further, in some embodiments, the angle may be 20 degrees.

In some embodiments, the discharge nozzle may include a swaged tip that has a tip diameter smaller than a body diameter of a body of the at least one feed tube of the feed tube assembly. The tip diameter may be 2 millimeters.

In some embodiments, the housing may include a first half and a second half, and the first half and the second half may be affixed to one another by the frictional weld. Additionally, in some embodiments, a second wheel end bearing may be coupled to the at least one of the plurality of wheels at a second end of the at least one of the plurality of wheels opposite the first end, and the discharge nozzle may be positioned in the housing to discharge pressurized lubrication fluid toward the frictional weld to lubricate the second wheel end bearing in a controlled manner without constant delivery of lubrication fluid to the second wheel end bearing.

In some embodiments, the discharge nozzle may be positioned in the housing to discharge pressurized lubrication fluid toward the frictional weld along one of more first flow paths that extend beyond the frictional weld in a direction parallel to the rotational axis when the vehicle is operated at a first plurality of speeds. The discharge nozzle may be positioned in the housing to discharge pressurized lubrication fluid toward the frictional weld along one of more second flow paths that do not extend beyond the frictional weld in the direction parallel to the rotational axis when the vehicle is operated at a second plurality of speeds, and at least some of the second plurality of speeds may be less than at least some of the first plurality of speeds.

According to another aspect of the present disclosure, a powertrain for a vehicle may include a transaxle having a housing, an axle assembly at least partially disposed in the housing, and a lubrication distribution system at least partially disposed in the housing that includes a feed tube assembly to deliver pressurized lubrication fluid to at least one wheel end bearing in use of vehicle. At least one of a plurality of wheels of the vehicle may be mounted to the axle assembly to be driven for rotation by the axle assembly about a rotational axis. A first wheel end bearing of the vehicle may be coupled to the at least one of the plurality of wheels at a first end of the at least one of the plurality of wheels. A second wheel end bearing of the vehicle may be coupled to the at least one of the plurality of wheels at a second end of the at least one of the plurality of wheels opposite the first end. The feed tube assembly may be mounted to the housing such that a discharge nozzle of at least one feed tube of the feed tube assembly extends toward a frictional weld of the housing. The discharge nozzle may be positioned in the housing to discharge pressurized lubrication fluid toward the frictional weld to lubricate the first wheel end bearing and the second wheel end bearing in a controlled manner without constant delivery of lubrication fluid to the first wheel end bearing or to the second wheel end bearing.

In some embodiments, the housing may include a first half and a second half, the first half and the second half may be affixed to one another by the frictional weld, the frictional weld may include joint material extending in a radial direction toward the rotational axis, and the discharge nozzle of the at least one feed tube of the feed tube assembly may extend toward the joint material.

In some embodiments, the at least one feed tube of the feed tube assembly may be directly affixed to the housing such that (i) a body of the at least one feed tube extends parallel to the rotational axis and (ii) the discharge nozzle coupled to the body extends at an angle relative to the rotational axis. The angle may be 20 degrees. The discharge nozzle may include a swaged tip that has a tip diameter smaller than a body diameter of a body of the at least one feed tube of the feed tube assembly. The tip diameter may be 2 millimeters.

According to yet another aspect of the present disclosure, a method of delivering pressurized lubrication fluid to at least one wheel end bearing of a vehicle may include arranging one or more feed tubes to at least partially form a feed tube assembly of a lubrication distribution system, affixing the feed tube assembly to a first housing half, forming a housing of a vehicle transaxle by welding the first housing half to a second housing half, wherein welding the first housing half to the second housing half includes defining at least one frictional weld extending into an interior of the housing, arranging an axle assembly of the transaxle in the housing, mounting the axle assembly to at least one of a plurality of wheels of the vehicle to permit rotation of the at least one of the plurality of wheels about a rotational axis, coupling the at least one of the plurality of wheels to a first wheel end bearing at a first end of the at least of the plurality of wheels, and discharging pressurized lubrication fluid through the feed tube assembly toward the at least one frictional weld to lubricate the first wheel end bearing in a controlled manner without constant delivery of lubrication fluid to the first wheel end bearing.

In some embodiments, arranging the one or more feed tubes to at least partially form the feed tube assembly may include defining a discharge nozzle including a swaged tip having a tip diameter that is less than a body diameter of a body of the one or more feed tubes. Affixing the feed tube assembly to the first housing half may include locating the discharge nozzle relative to the at least one frictional weld.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 7 is a simplified flowchart of another portion of the method of FIG. 6.

DETAILED DESCRIPTION

Figure 1:
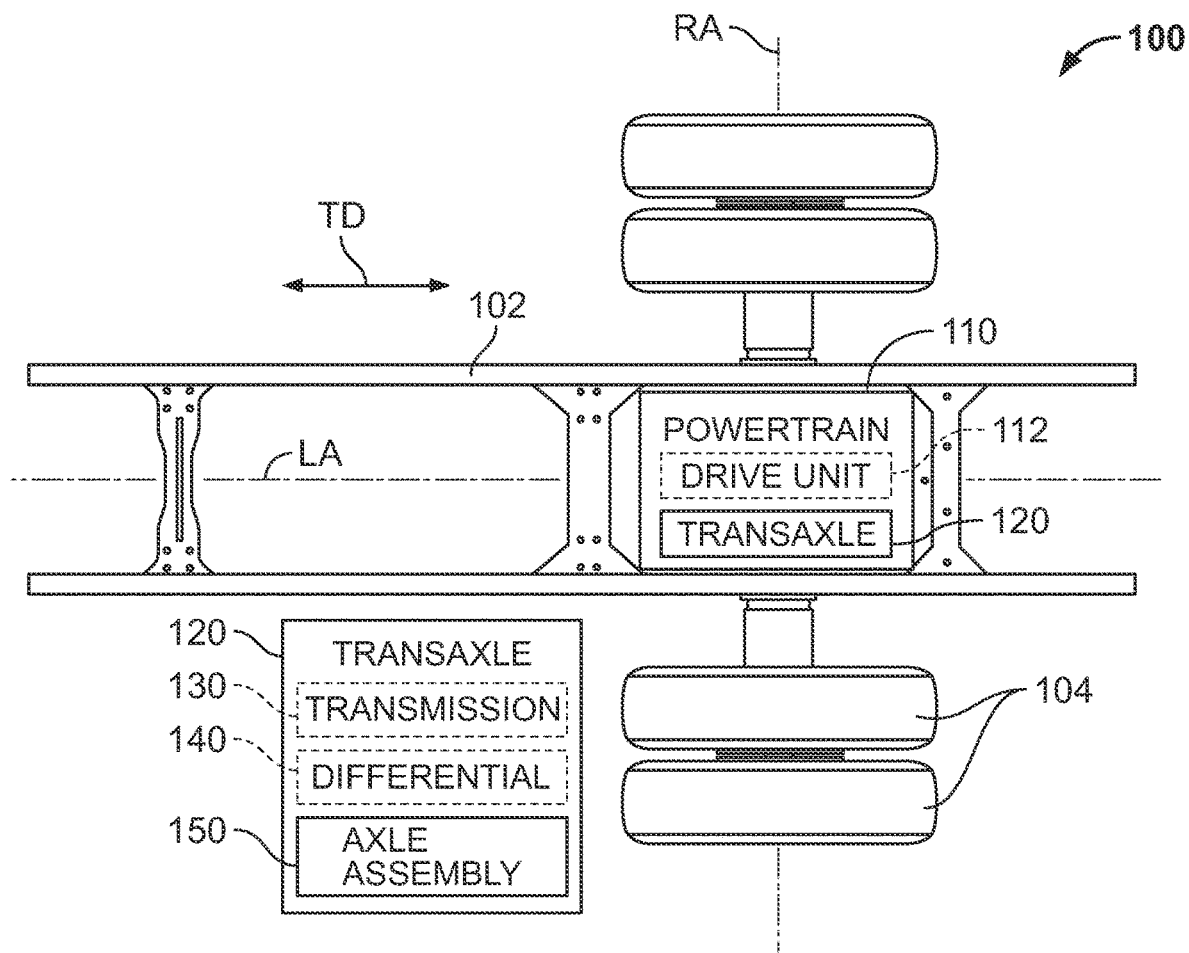
FIG. 1 is a partial diagrammatic depiction of a powertrain adapted for use in a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative vehicle 100 includes a chassis or main frame 102, wheels 104 coupled to the chassis 102 and each configured for rotation about a rotational axis RA, and a powertrain 110 mounted to the chassis 102. In the illustrative embodiment, the powertrain 110 is embodied as, or otherwise includes, a collection of devices that are cooperatively capable of generating and transmitting rotational power to the wheels 104 of the vehicle 100 to propel the vehicle 100 in use thereof. In some embodiments, the powertrain 110 is mounted to the chassis 102 transverse to a longitudinal axis LA along which the chassis 102 extends. In those embodiments, the powertrain 110 is arranged transverse to a travel direction TD of the vehicle 100, and the powertrain 110 may be said to have a transverse mounting arrangement relative to the chassis 102. In other embodiments, however, the powertrain 110 may be mounted to the chassis 102 in another suitable manner.

In the illustrative embodiment, the powertrain 110 includes a drive unit 112 (shown in phantom in FIG. 1) to generate rotational power. The drive unit 112 may be embodied as, or otherwise include, any device or collection of devices capable of generating rotational power that may be transmitted to the wheels 104 to drive movement of the vehicle 100. The illustrative drive unit 112 is embodied as, or otherwise includes, one or more electric motors. Because the powertrain 110 incorporates one or more electric motors or powerplants, at least in some embodiments, the vehicle 100 is embodied as, or otherwise includes, an electric vehicle. In one example, the vehicle 100 is embodied as, or otherwise includes, a medium or heavy-duty electric truck or electric bus, and the powertrain 110 is employed in lieu of one or more conventional powertrain(s) associated with one or more internal combustion engine configuration(s). In any case, operation of the drive unit 112 may be controlled by an engine control module (not shown) that includes one or more processors and one or more memory devices.

The illustrative powertrain 100 also includes a transaxle 120 coupled to the drive unit 112 to receive rotational power therefrom and transmit rotational power to the wheels 104. The transaxle 120 may be embodied as, or otherwise include, any collection of devices capable of receiving rotational power from the drive unit 112 and transmitting rotational power to the wheels 104. In the illustrative embodiment, the transaxle 120 includes a transmission 130 (shown in phantom in FIG. 1), a differential 140 (shown in phantom in FIG. 1) coupled to the transmission 130, and an axle assembly 150 coupled to the differential 140.

Figure 2:
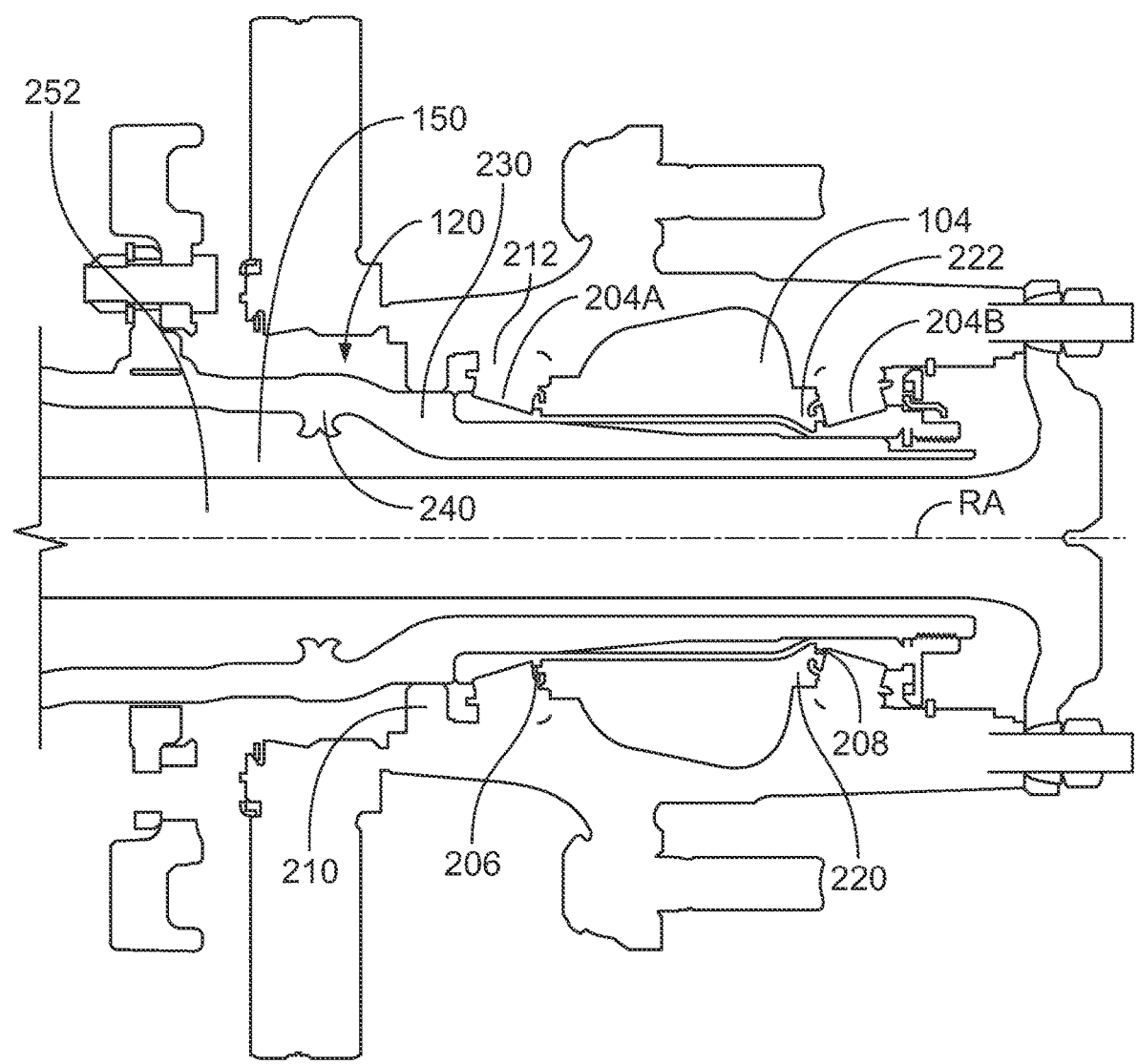
FIG. 2 is a partial sectional view of a transaxle adapted for inclusion in the powertrain of FIG. 1.
Figure 3:
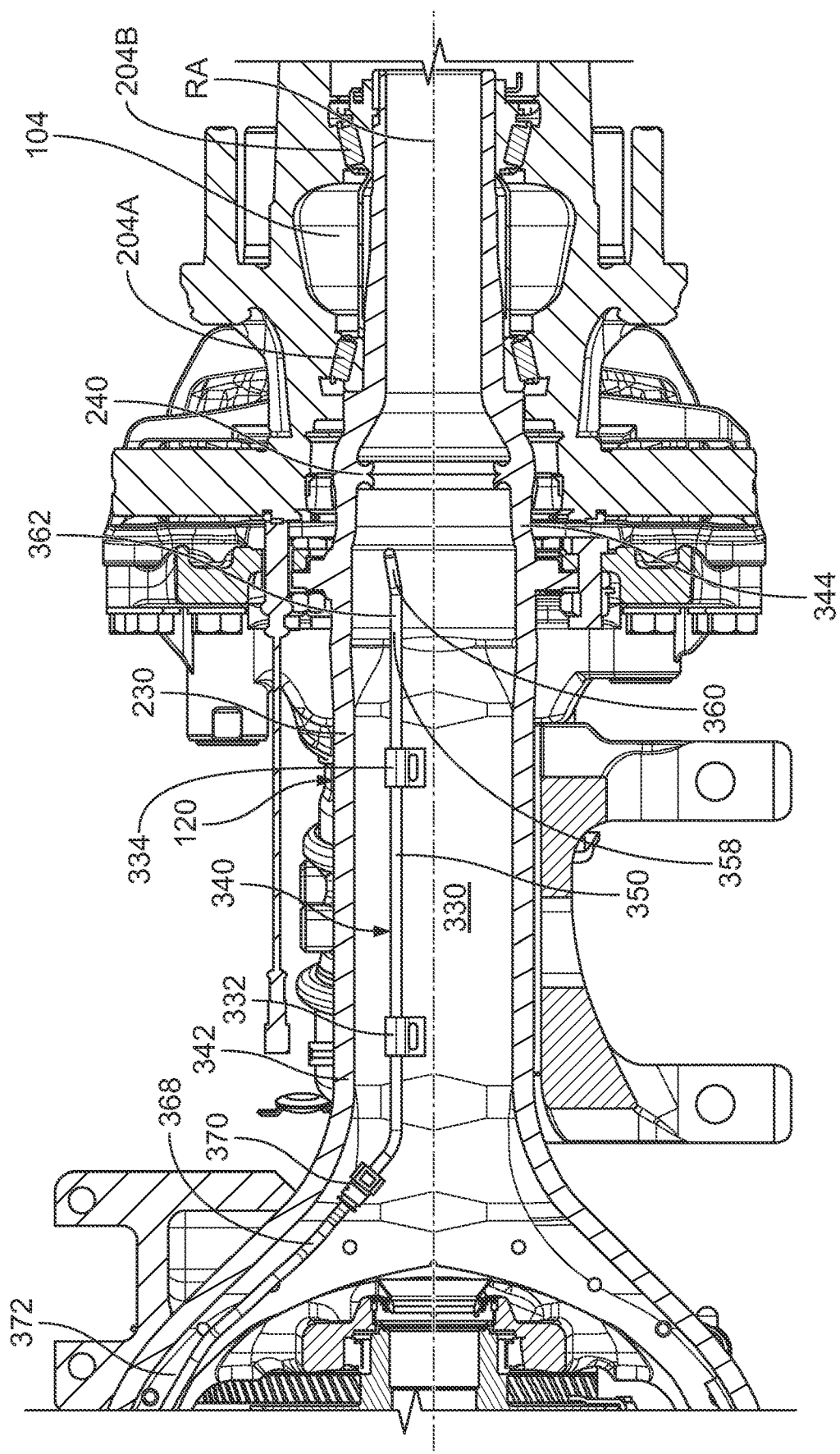
FIG. 3 is a partial sectional view similar to FIG. 2 showing a lubrication distribution system at least partially disposed in a housing of a transaxle.

As best seen in FIGS. 2 and 3, in the illustrative embodiment, the transaxle 120 includes a housing 230, the axle assembly 150 at least partially disposed in the housing 230, and a lubrication distribution system 340 at least partially disposed in the housing 230. The lubrication distribution system 340 includes a feed tube assembly 350 configured to deliver pressurized lubrication fluid to at least one wheel end bearing in use of the vehicle 100. In particular, the feed tube assembly 350 is mounted to the housing 230 such that a discharge nozzle 360 of at least one feed tube 358 of the feed tube assembly 350 extends toward a frictional weld 240 of the housing 230. As discussed in greater detail below, the discharge nozzle 360 is positioned in the housing 230 to discharge pressurized lubrication fluid toward the frictional weld 240 to lubricate wheel end bearings 204A, 204B in a controller manner without constant delivery of lubrication fluid to the wheel end bearings 204, 204B.

It should be appreciated that the illustrative vehicle 100, and the powertrain 110 included therein, may be employed in a variety of applications. In some embodiments, the vehicle 100 may be embodied as, or otherwise include, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, the powertrain 110 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

Referring now to FIG. 2, at least one of the wheels 104 is mounted to the axle assembly 150 to be driven for rotation by the axle assembly 150 about the rotational axis RA. In some embodiments, the axle assembly 150 includes an axle 252 arranged to extend along, and configured for rotation about, the rotational axis RA to drive rotation of the at least one of the wheels 104. The illustrative vehicle 100 includes the wheel end bearings 204A, 204B that are coupled to the at least one wheel 104 at opposite ends 206, 208 thereof, respectively.

At least in some embodiments, the wheel end bearings 204A, 204B are configured to support the at least one wheel 104 for rotation with the axle 252 about the rotational axis RA relative to a stationary component 212 of the vehicle 100. Each of the wheel end bearings 204A, 204B may be embodied as, or otherwise include, a tapered roller bearing. In other embodiments, however, each of the wheel end bearings 204A, 204B may be embodied as, or otherwise include, another suitable roller bearing, such as a cylindrical roller bearing, a needle roller bearing, or a spherical roller bearing, for example. In other embodiments still, each of the wheel end bearings 204A, 204B may be embodied as, or otherwise include a ball bearing, such as a deep groove ball bearing, an insert ball bearing, an angular contact ball bearing, a self-aligning ball bearing, a thrust ball bearing, an angular contact thrust ball bearing, or a thin section ball bearing, for instance. Regardless, each of the wheel end bearings 204A, 204B requires lubrication in use of the vehicle 100 to ensure proper functioning thereof.

In the illustrative embodiment, constant delivery of lubrication fluid to the wheel end bearings 204A, 204B in use of the vehicle 100 is contrary to the bearing manufacturer's recommendation. In some configurations, when the axle 252 is driven for rotation at or above a threshold speed, excess lubrication fluid delivered to the wheel end bearings 204A, 204B may be confined or trapped as a result of centrifugal forces. In such configurations, trapped excess lubrication fluid may exert pressure on at least one seal 210 located forward (i.e., to the left as depicted in FIG. 2) of the wheel end bearing 204A along the rotational axis RA. That pressure may degrade the at least one seal 210 and/or shorten the operational life thereof, thereby contributing to undesirable leakage of lubrication fluid away from the wheel end bearings 204A, 204B.

Further, in some configurations, excess lubrication fluid delivered to the wheel end bearings 204A, 204B may cause bearing drag and/or churning. The force applied to a bearing element (e.g., a roller) of each of the bearings 204A, 204B as the bearing element translates and/or rotates through the lubrication fluid may be referred to as bearing drag. Bearing drag may result from shear stress exerted on the bearing element due to the viscosity of the lubrication fluid and from compressive stress exerted on the bearing element in use of the bearing. Those stresses may be applied to the bearing element in opposition to a rolling direction thereof. The moment or torque experienced by the bearing as a consequence of rotation of the bearing element in the lubrication fluid may be referred to as churning. Churning may be caused at least in part by the shearing of lubrication fluid at the surface of the bearing element.

To avoid the aforementioned drawbacks associated with constant delivery of lubrication fluid and excess fluid accumulation, the lubrication distribution system 340 of the present disclosure is configured to deliver pressurized lubrication fluid to the wheel end bearings 204A, 204B in a controlled, periodic manner. As discussed in greater detail below with reference to FIG. 5, the lubrication distribution system 340 is adapted to occasionally spray or discharge pressurized lubrication fluid toward the frictional weld 240 to lubricate the wheel end bearings 204A, 204B when the vehicle 100 is operated over a range of speeds. In some embodiments, at least some of the pressurized lubrication fluid provided by the lubrication distribution system 340 may be stored in a fluid reservoir 220 disposed in a wheel end hub 222 of the axle assembly 150. Additionally, in some embodiments, continued delivery of pressurized lubrication fluid using the lubrication distribution system 340 may replenish the fluid reservoir 220 and thereby provide additional lubrication fluid for the wheel end bearings 204A, 204B and/or other components of the vehicle 100, as the case may be.

Referring now to FIG. 3, the feed tube assembly 350 of the illustrative lubrication distribution system 340 includes the at least one feed tube 358 and an upstream feed tube 368 fluidly coupled thereto via a connector 370. In the illustrative embodiment, the upstream feed tube 368 is in fluid communication with a gearbox housing 372 which, in some embodiments, may be included in, or otherwise form a portion of, the transmission 130. For the purposes of the present disclosure, the gearbox housing 372 may be referred to as a source of lubrication fluid that is conducted downstream using the lubrication distribution system 340 toward the wheel end bearings 204A, 204B in use of the vehicle 100.

In some embodiments, the at least one feed tube 358 includes a single feed tube defining the discharge nozzle 360. In other embodiments, the at least one feed tube 358 includes multiple feed tubes that are fluidly coupled to one another to define the discharge nozzle 360. In any case, each of the feed tubes 358 and 368 includes, or is otherwise embodied as, a hose, conduit, or the like sized to conduct lubrication fluid supplied by the gearbox housing 372 toward the wheel end bearings 204A, 204B as discussed above. Lubrication fluid supplied by the gearbox housing 372 is illustratively pumped, and thereby pressurized, to the lubrication distribution system 340 via a pump (not shown) included in the vehicle 100. In some embodiments, operation of the pump may be driven by an output shaft of the transmission 130 and/or the axle 252 in use of the vehicle 100.

The at least one feed tube 358 is directly affixed to an inner wall 330 of the housing 230 using mount brackets 332, 334. More particularly, the at least one feed tube 358 is directly affixed to the inner wall 330 such that a body 362 of the at least one feed tube 358 extends parallel to the rotational axis RA and the discharge nozzle 360 coupled to the body 362 extends at an angle relative to the rotational axis RA. Even more particularly, the at least one feed tube 358 is directly affixed to the inner wall 330 such that the discharge nozzle 360 is located forward of (i.e., to the left of as shown in FIG. 3) the frictional weld 240.

Figure 4:
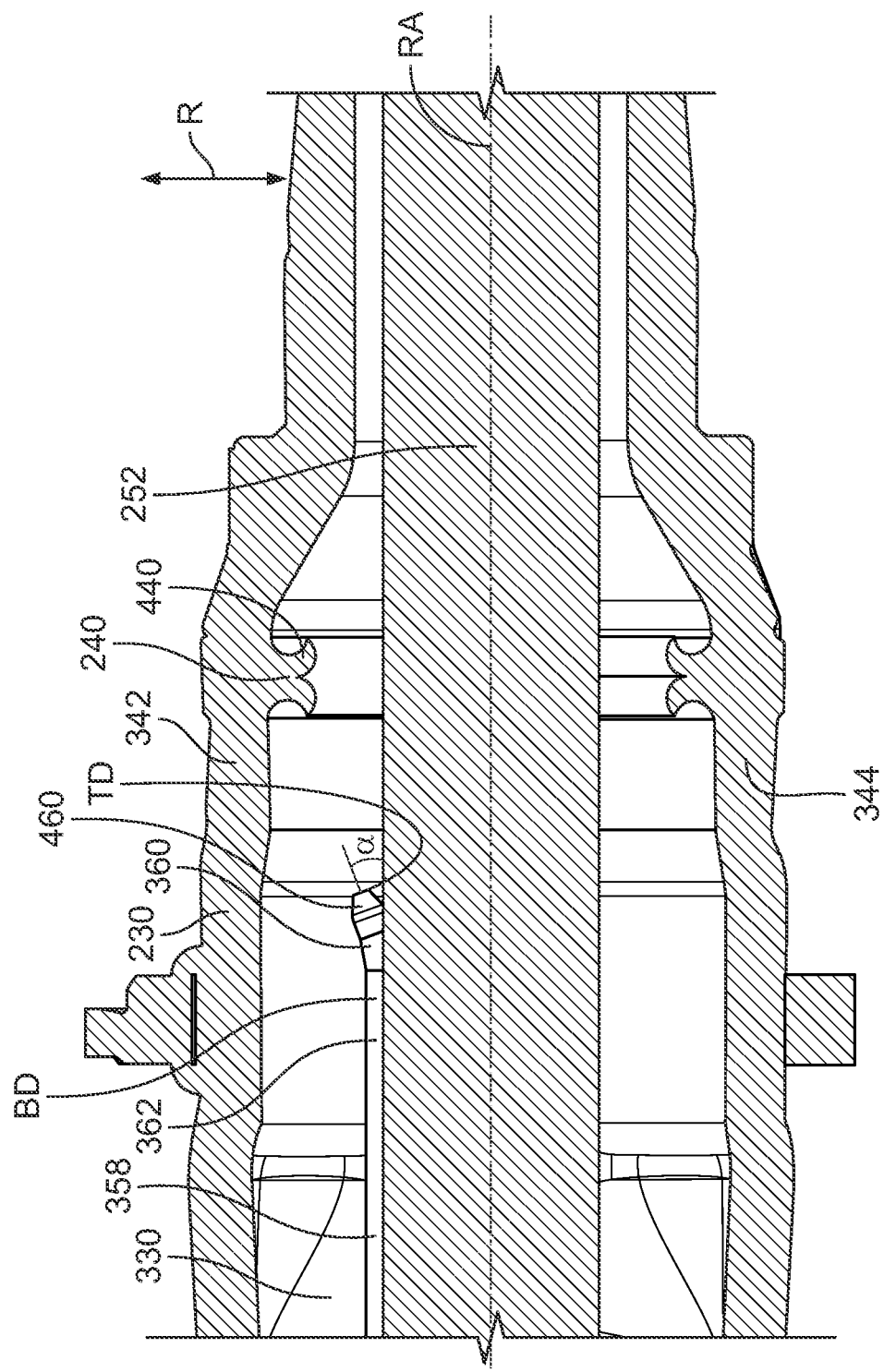
FIG. 4 is a magnified, partial sectional view showing a discharge nozzle of the lubrication distribution system of FIG. 3 located in proximity to at least one frictional weld of the housing.

In the illustrative embodiment, the housing 230 includes halves 342, 344 that are affixed to one another by the frictional weld 240. As best seen in FIG. 4, the frictional weld 240 includes, or is otherwise defined by, joint material 440 that extends in a radial direction indicated by arrow R toward the rotational axis RA. The joint material 440 includes material from the housing 230 (e.g., the housing half 342 and the housing half 344) that is plastically displaced during a frictional welding process to form the frictional weld 240 and fuse the halves 342, 344 to one another without melting the halves 342, 344. The discharge nozzle 360 of the lubrication distribution system 340 illustratively extends toward the joint material 440.

In at least some embodiments, provision of the lubrication distribution system 340 may obviate the need for one or more seals (e.g., the seal(s) 210) which may be located at opposite ends of one or more of the wheels 204 in other configurations. In those embodiments, the absence of such seal(s) forestalls seal degradation that may result from an excess supply of lubrication fluid, as mentioned above. Of course, in other embodiments, it should be appreciated that the lubrication distribution system 340 may be employed in combination with one or more seals disposed at opposite ends of one or more of the wheels 204, as the case may be.

In at least some embodiments, due to direct delivery of lubrication fluid from the gearbox housing 372 to the wheel end bearings 204A, 204B using the lubrication distribution system 340, only one lubrication fluid source is needed to lubricate the bearings 204A, 204B in use of the vehicle 100. Consequently, in those embodiments, only one type of lubrication fluid is needed to lubricate the bearings 204A, 204B. In contrast, other configurations may utilize more than one lubrication fluid source and/or more than one lubrication fluid type for bearing lubrication, which may present drawbacks such as leakage between two different types of lubrication fluid, for example.

Referring now to FIG. 4, the at least one feed tube 358 of the feed tube assembly 350 is directly affixed to the inner wall 330 of the housing 230 such that the body 362 extends parallel to the axle 252 and the rotational axis RA. In the illustrative embodiment, the discharge nozzle 360 is bent relative to the body 362. In particular, the discharge nozzle 360 is bent relative to the body 362 such that the discharge nozzle 360 extends at an angle $\alpha$ of 20 degrees relative to the body 362 and the rotational axis RA.

The illustrative discharge nozzle 360 includes a swaged tip 460 at which the discharge nozzle 360 terminates. For the purposes of the present disclosure, the term "swaged" refers to a reduced dimension of the tip 460 compared to other portions of the at least one feed tube 358, such as a reduced cross-sectional dimension, for example. In some embodiments, the swaged tip 460 may be formed by a forging technique using a die to alter the dimension(s) of the discharge nozzle 360. Regardless, in the illustrative embodiment, the swaged tip 460 has a tip diameter TD that is smaller than a body diameter BD of the body 362 of the at least one feed tube 358. The tip diameter TD is illustratively two millimeters.

Figure 5:
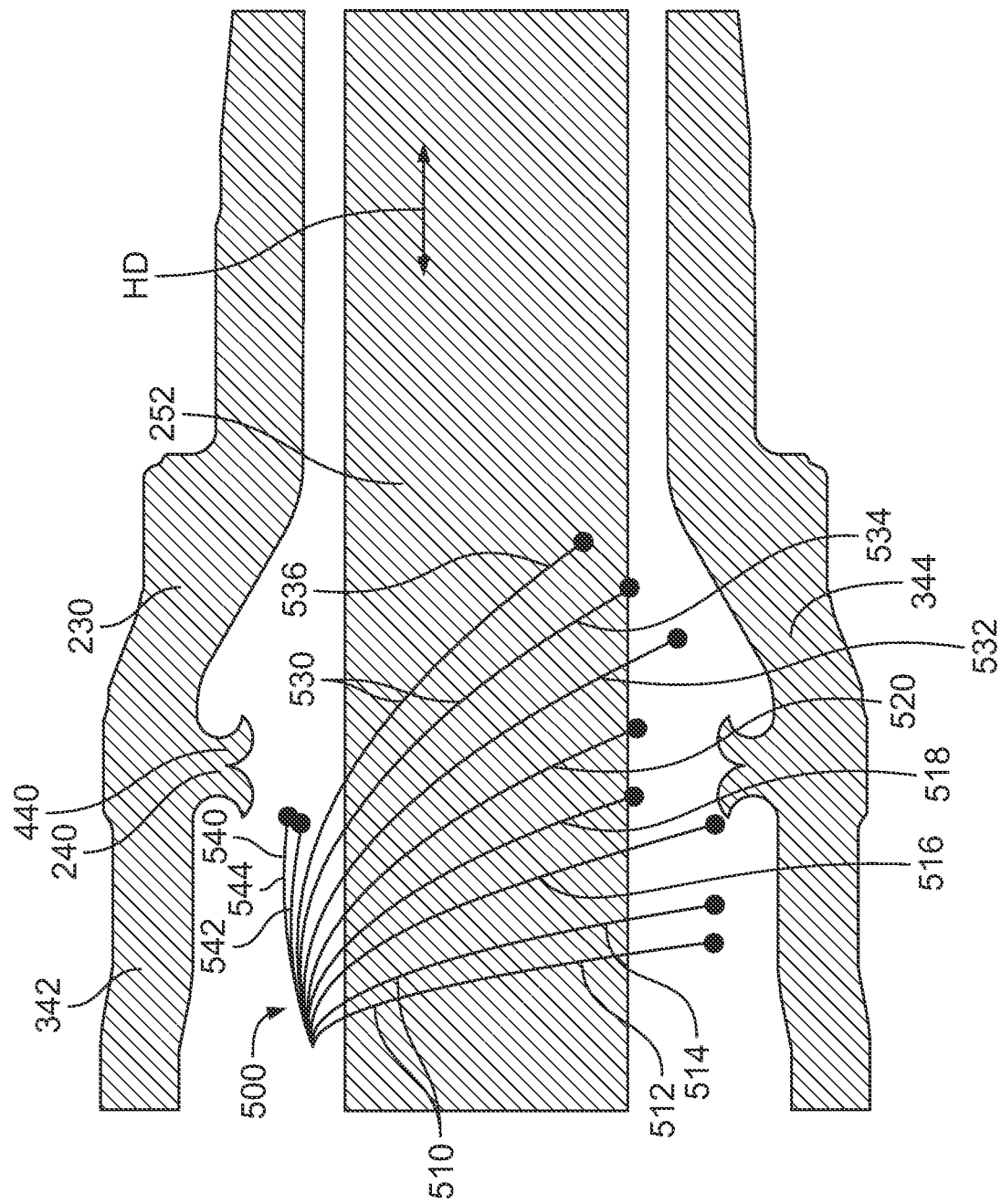
FIG. 5 is a partial sectional view depicting various flow paths of pressurized lubrication fluid discharged by the discharge nozzle of FIG. 4 in use of the lubrication distribution system.

Referring now to FIG. 5, in use of the illustrative lubrication distribution system 340, pressurized lubrication fluid is discharged by the discharge nozzle 360 along various flow paths 500 toward the frictional weld 240. Each of the flow paths 500 corresponds to, or is otherwise embodied as, a controlled trajectory of pressurized lubrication fluid discharged by the nozzle 360. It should be appreciated that for the purposes of the present disclosure, (i) the angle α of the discharge nozzle 360 relative to the body 362 and the rotational axis RA (i.e., the aforementioned 20 degree angle) and (ii) the diameter of the swaged tip 460 (i.e., the aforementioned two millimeter diameter) illustratively cooperate to impart control to the discharge trajectories. Such control is envisioned by the present disclosure to provide periodic lubrication to the wheel end bearings 204A, 204B while avoiding excess lubrication and thereby minimizing bearing drag and/or churning.

In the illustrative embodiment, the flow paths 500 include a plurality of low speed flow paths 510. Each of the flow paths 510 includes, or is otherwise embodied as, a controlled discharge of pressurized lubrication fluid by the discharge nozzle 360 when the vehicle 100 is operated at a low speed or a range of low speeds or relatively low speeds. In some embodiments, each of the flow paths 510 may be defined by, or otherwise correspond to, at least one reference or predetermined output speed associated with at least one component of the powertrain 110, such as the drive unit 112 and/or the axle 252, for example.

The illustrative low speed flow paths 510 include low speed flow paths 512, 514, 516, 518, 520. In some embodiments, the low speed flow path 512 corresponds to an output speed (e.g., of an output shaft of the drive unit 112 and/or the axle 252) of 20 revolutions per minute. Additionally, in some embodiments, the low speed flow path 514 corresponds to an output speed of 30 revolutions per minute. In some embodiments still, the low speed flow path 516 corresponds to an output speed of 40 revolutions per minute. In some embodiments yet still, the low speed flow path 518 corresponds to an output speed of 50 revolutions per minute. Finally, in some embodiments, the low speed flow path 520 corresponds to an output speed of 60 revolutions per minute. In the illustration of FIG. 5, each of the flow paths 512, 514, 516, 518, 520 does not extend beyond the frictional weld 240 in a horizontal direction HD parallel to the rotational axis RA. As such, lubrication fluid discharged by the nozzle 360 along one of the flow paths 512, 514, 516, 518, 520 generally does not have sufficient velocity to reach beyond the joint material 440 of the frictional weld 240 in the horizontal direction HD.

In the illustrative embodiment, the flow paths 500 include a plurality of medium speed flow paths 530. Each of the flow paths 530 includes, or is otherwise embodied as, a controlled discharge of pressurized lubrication fluid by the discharge nozzle 360 when the vehicle 100 is operated at a medium speed or a range of medium speeds. In some embodiments, each of the flow paths 530 may be defined by, or otherwise correspond to, at least one reference or predetermined output speed associated with at least one component of the powertrain 110, such as the drive unit 112 and/or the axle 252, for example.

The illustrative medium speed flow paths 530 include medium speed flow paths 532, 534, 536. In some embodiments, the medium speed flow path 532 corresponds to an output speed (e.g., of an output shaft of the drive unit 112 and/or the axle 252) of 70 revolutions per minute. Additionally, in some embodiments, the medium speed flow path 534 corresponds to an output speed of 80 revolutions per minute. In some embodiments still, the medium speed flow path 536 corresponds to an output speed of 90 revolutions per minute. In the illustration of FIG. 5, each of the flow paths 532, 534, 536 extends beyond the frictional weld 240 in the horizontal direction HD. As such, lubrication fluid discharged by the nozzle 360 along one of the flow paths 532, 534, 536 generally has sufficient velocity to reach beyond the joint material 440 of the frictional weld 240 in the horizontal direction HD.

In the illustrative embodiment, the flow paths 500 include a plurality of high speed flow paths 540. Each of the flow paths 540 includes, or is otherwise embodied as, a controlled discharge of pressurized lubrication fluid by the discharge nozzle 360 when the vehicle 100 is operated at a high speed or a range of high speeds or relatively high speeds. In some embodiments, each of the flow paths 540 may be defined by, or otherwise correspond to, at least one reference or predetermined output speed associated with at least one component of the powertrain 110, such as the drive unit 112 and/or the axle 252, for example.

The illustrative high speed flow paths 540 include high speed flow paths 542, 544. In some embodiments, the high speed flow path 542 corresponds to an output speed (e.g., of an output shaft of the drive unit 112 and/or the axle 252) of 100 revolutions per minute. Additionally, in some embodiments, the high speed flow path 544 corresponds to an output speed of 110 revolutions per minute. In the illustration of FIG. 5, each of the flow paths 542, 544 does not extend beyond the frictional weld 240 in the horizontal direction HD. In some embodiments, lubrication fluid discharged by the nozzle 360 along one of the flow paths 542, 544 at high or relative high velocities may contact the joint material 440 and be deflected and/or displaced forward of the frictional weld 240 in the horizontal direction HD such that the lubrication fluid does not reach beyond the joint material 440 in the horizontal direction HD.

It should be appreciated that pressurized lubrication fluid discharged by the nozzle 360 along the flow paths 500 in use of the illustrative lubrication distribution system 340 generally does not splash into the wheel end bearings 204A, 204B or the wheel end hub 222. As a result, the lubrication distribution system 340 is illustratively designed to periodically lubricate the wheel end bearings 204A, 204B without overfeeding the bearings 204A, 204B. As mentioned above, due to the periodic, controlled delivery of lubrication fluid to the bearings 204A, 204B using the lubrication distribution system 340, wheel end seals (e.g., the seal 210) may be omitted, at least in some configurations.

Figure 6:
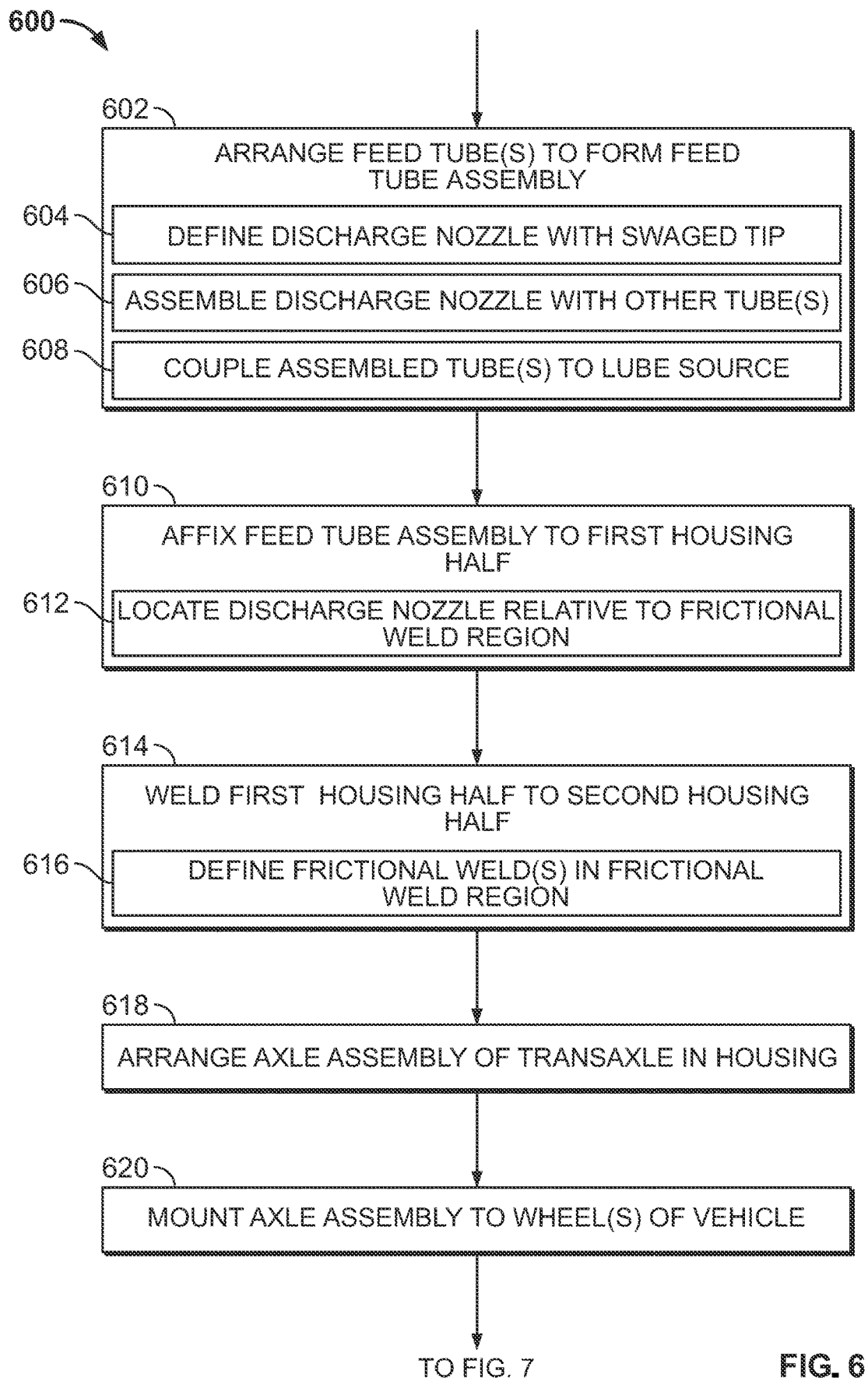
FIG. 6 is a simplified flowchart of a one portion of a method of delivering pressurized lubrication fluid to at least one wheel end bearing of the vehicle shown in FIG. 1.

Referring now to FIGS. 6 and 7, an illustrative method 600 of delivering pressurized lubrication fluid to at least one of the wheel end bearings 204A, 204B using the lubrication distribution system 340 is depicted. It should be appreciated that at least some blocks of the method 600 may be performed manually (e.g., by one or more operators), at least in some embodiments. In other embodiments, at least some blocks of the method 600 may be performed by an electronic control system capable of receiving input provided by one or more operators and controlling operation of various components of the vehicle 100 (e.g., the pump) based on the received input. In any case, the method 600 corresponds to, or is otherwise associated with, performance of the blocks described below in the illustrative sequence of FIGS. 6 and 7. It should be appreciated, however, that the method 600 may be performed in one or more sequences different from the illustrative sequence.

The illustrative method 600 begins with block 602. In block 602, the feed tubes are arranged to form the feed tube assembly 350. In the illustrative embodiment, to perform block 602, blocks 604, 606, 608 are performed. In block 604, the discharge nozzle 360 of the at least one feed tube 358 with the swaged tip 460 is defined and/or provided. In block 606, the at least one feed tube 358 is assembled with the upstream feed tube 368 and/or fluidly coupled to the upstream feed tube 368 to establish the feed tube assembly 350. In block 608, the assembled tubes 358, 368 of the feed tube assembly 350 are fluidly coupled to the gearbox housing 372, which serves a source of lubrication fluid as mentioned above. From block 602, the method 600 proceeds to block 610.

In block 610 of the illustrative method 600, the feed tube assembly 350 is affixed to one of the halves 342, 344 of the housing 230. To perform block 610, in the illustrative embodiment, block 612 is performed. In block 612, the discharge nozzle 360 of the feed tube assembly 350 is located relative to the frictional weld region where the frictional weld 240 will be formed. In some embodiments, the discharge nozzle 360 may be located relative to the frictional weld region in block 612 to establish a reference or predetermined distance (e.g., a distance in the horizontal direction HD) between the swaged tip 460 of the discharge nozzle 360 and the frictional weld region. From block 610, the method proceeds to block 614.

In block 614 of the illustrative method 600, the halves 342, 344 of the housing 230 are welded to one another. In the illustrative embodiment, to perform block 614, block 616 is performed. In block 616, the frictional weld 240 is formed in the frictional weld region. As a consequence of performing block 616, the joint material 440 of the frictional weld 240 extends in the radial direction R into an interior of the housing 230 toward the rotational axis RA as indicated above. In some embodiments, block 610 of the illustrative method 600 is performed before block 614. In any case, from block 614, the method 600 proceeds to block 618.

In block 618 of the illustrative method 600, the axle assembly 150 of the transaxle 120 is arranged in the housing 230. In some embodiments, as a result of performing block 618, the axle 252 is arranged in the housing 230 such that the axle 252 extends along, and is configured for rotation about, the rotational axis RA as indicated above. From block 618, the method 600 proceeds to block 620.

In block 620 of the illustrative method 600, the axle assembly 150 is mounted to the wheels 104 of the vehicle 100. In particular, the axle 252 is mounted to the wheels 104 to permit rotation of the axle 252 and the wheels 104 about the rotational axis RA. From block 620, the method 600 proceeds to block 722.

In block 722 of the illustrative method 600, at least one of the wheels 104 is coupled to the wheel end bearing 204A at the end 206 thereof. Consequently, the at least one of the wheels 104 is supported for rotation relative to the stationary component 212 at the end 206 by the wheel end bearing 204A. From block 722, the method 600 proceeds to block 724.

In block 724 of the illustrative method 600, the at least one of the wheels 104 is coupled to the wheel end bearing 204B at the end 208 thereof. As a result, the at least one of the wheels 104 is supported for rotation relative to the stationary component 212 at the end 208 by the wheel end bearing 204B. From block 724, the method 600 proceeds to block 726.

In block 726 of the illustrative method 600, pressurized lubrication fluid is discharged through the feed tube assembly 350 toward the frictional weld 240 to lubricate the wheel end bearings 204A, 204B in a controlled manner without constant delivery of lubrication fluid to the wheel end bearings 204A, 204B as discussed above. In the illustrative embodiment, as a consequence of performing block 726, lubrication fluid is pumped from the gearbox housing 372 through the feed tube assembly 350 and discharged from the nozzle 360 toward the frictional weld 240.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A vehicle comprising:
   a chassis;
   a plurality of wheels coupled to the chassis; and
   a powertrain mounted to the chassis comprising a transaxle that includes a housing, an axle assembly at least partially disposed in the housing, and a lubrication distribution system at least partially disposed in the housing that includes a feed tube assembly to deliver pressurized lubrication fluid to at least one wheel end bearing in use of the vehicle,
   wherein:
   at least one of the plurality of wheels is mounted to the axle assembly to be driven for rotation by the axle assembly about a rotational axis,
   a first wheel end bearing is coupled to the at least one of the plurality of wheels at a first end of the at least one of the plurality of wheels,
   the feed tube assembly is mounted to the housing such that a discharge nozzle of at least one feed tube of the feed tube assembly extends toward a frictional weld of the housing, and
   the discharge nozzle is positioned in the housing to discharge pressurized lubrication fluid toward the frictional weld to lubricate the first wheel end bearing in a controlled manner without constant delivery of lubrication fluid to the first wheel end bearing.

2. The vehicle of claim 1, wherein the at least one feed tube of the feed tube assembly is directly affixed to the housing.

3. The vehicle of claim 1, wherein the at least one feed tube of the feed tube assembly is directly affixed to the housing such that (i) a body of the at least one feed tube extends parallel to the rotational axis and (ii) the discharge nozzle coupled to the body extends at an angle relative to the rotational axis.

4. The vehicle of claim 3, wherein the discharge nozzle is bent relative to the body.

5. The vehicle of claim 3, wherein the angle is 20 degrees.

6. The vehicle of claim 1, wherein the discharge nozzle comprises a swaged tip that includes a tip diameter smaller than a body diameter of a body of the at least one feed tube of the feed tube assembly.

7. The vehicle of claim 6, wherein the tip diameter is 2 millimeters.

8. The vehicle of claim 1, wherein:
   the housing comprises a first half and a second half, and the first half and the second half are affixed to one another by the frictional weld.

9. The vehicle of claim 1, wherein:
a second wheel end bearing is coupled to the at least one of the plurality of wheels at a second end of the at least one of the plurality of wheels opposite the first end, and
the discharge nozzle is positioned in the housing to discharge pressurized lubrication fluid toward the frictional weld to lubricate the second wheel end bearing in a controlled manner without constant delivery of lubrication fluid to the second wheel end bearing.

10. The vehicle of claim 1, wherein the discharge nozzle is positioned in the housing to discharge pressurized lubrication fluid toward the frictional weld along one of more first flow paths that extend beyond the frictional weld in a direction parallel to the rotational axis when the vehicle is operated at a first plurality of speeds.

11. The vehicle of claim 10, wherein:
the discharge nozzle is positioned in the housing to discharge pressurized lubrication fluid toward the frictional weld along one of more second flow paths that do not extend beyond the frictional weld in the direction parallel to the rotational axis when the vehicle is operated at a second plurality of speeds; and
at least some of the second plurality of speeds are less than at least some of the first plurality of speeds.

12. A powertrain for a vehicle, the powertrain comprising:
a transaxle including a housing, an axle assembly at least partially disposed in the housing, and a lubrication distribution system at least partially disposed in the housing that includes a feed tube assembly to deliver pressurized lubrication fluid to at least one wheel end bearing in use of vehicle,
wherein:
at least one of a plurality of wheels of the vehicle is mounted to the axle assembly to be driven for rotation by the axle assembly about a rotational axis,
a first wheel end bearing of the vehicle is coupled to the at least one of the plurality of wheels at a first end of the at least one of the plurality of wheels,
a second wheel end bearing of the vehicle is coupled to the at least one of the plurality of wheels at a second end of the at least one of the plurality of wheels opposite the first end,
the feed tube assembly is mounted to the housing such that a discharge nozzle of at least one feed tube of the feed tube assembly extends toward a frictional weld of the housing, and
the discharge nozzle is positioned in the housing to discharge pressurized lubrication fluid toward the frictional weld to lubricate the first wheel end bearing and the second wheel end bearing in a controlled manner without constant delivery of lubrication fluid to the first wheel end bearing or to the second wheel end bearing.

13. The powertrain of claim 12, wherein:
the housing comprises a first half and a second half, the first half and the second half are affixed to one another by the frictional weld,
the frictional weld includes joint material extending in a radial direction toward the rotational axis, and
the discharge nozzle of the at least one feed tube of the feed tube assembly extends toward the joint material.

14. The powertrain of claim 12, wherein the at least one feed tube of the feed tube assembly is directly affixed to the housing such that (i) a body of the at least one feed tube extends parallel to the rotational axis and (ii) the discharge nozzle coupled to the body extends at an angle relative to the rotational axis.

15. The powertrain of claim 14, wherein the angle is 20 degrees.

16. The powertrain of claim 15, wherein the discharge nozzle comprises a swaged tip that includes a tip diameter smaller than a body diameter of a body of the at least one feed tube of the feed tube assembly.

17. The powertrain of claim 16, wherein the tip diameter is 2 millimeters.

18. A method of delivering pressurized lubrication fluid to at least one wheel end bearing of a vehicle, the method comprising:
arranging one or more feed tubes to at least partially form a feed tube assembly of a lubrication distribution system;
affixing the feed tube assembly to a first housing half;
forming a housing of a vehicle transaxle by welding the first housing half to a second housing half, wherein welding the first housing half to the second housing half includes defining at least one frictional weld extending into an interior of the housing;
arranging an axle assembly of the transaxle in the housing;
mounting the axle assembly to at least one of a plurality of wheels of the vehicle to permit rotation of the at least one of the plurality of wheels about a rotational axis;
coupling the at least one of the plurality of wheels to a first wheel end bearing at a first end of the at least of the plurality of wheels; and
discharging pressurized lubrication fluid through the feed tube assembly toward the at least one frictional weld to lubricate the first wheel end bearing in a controlled manner without constant delivery of lubrication fluid to the first wheel end bearing.

19. The method of claim 18, wherein arranging the one or more feed tubes to at least partially form the feed tube assembly comprises defining a discharge nozzle including a swaged tip having a tip diameter that is less than a body diameter of a body of the one or more feed tubes.

20. The method of claim 19, wherein affixing the feed tube assembly to the first housing half comprises locating the discharge nozzle relative to the at least one frictional weld.

* * * * *